April 19, 1932. C. E. PIERSALL 1,855,067
AUTOMOBILE BRAKE
Filed July 13, 1929 4 Sheets-Sheet 2
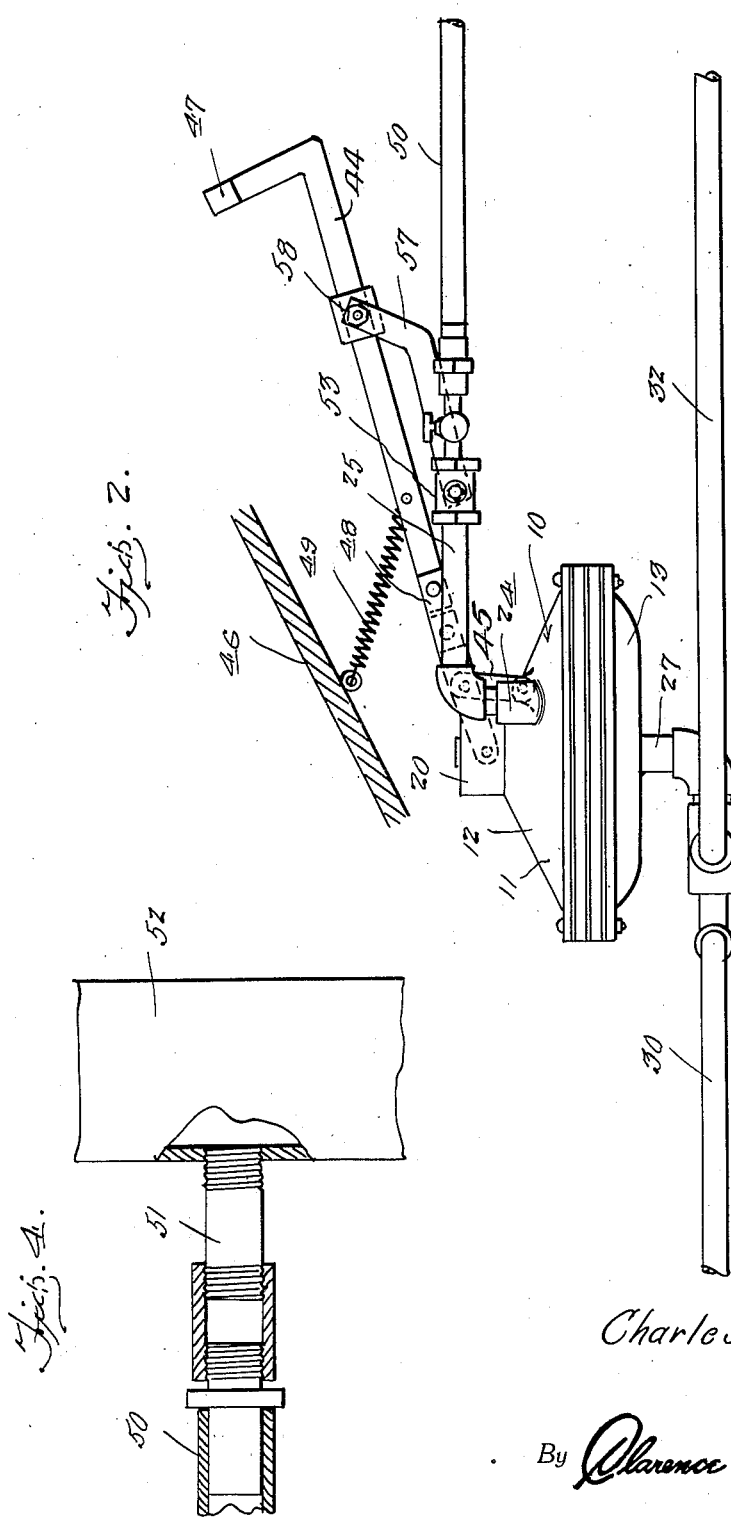
Inventor
Charles E. Piersall
By Clarence A. O'Brien
Attorney April 19, 1932.   C. E. PIERSALL   1,855,067
AUTOMOBILE BRAKE
Filed July 13, 1929   4 Sheets-Sheet 3
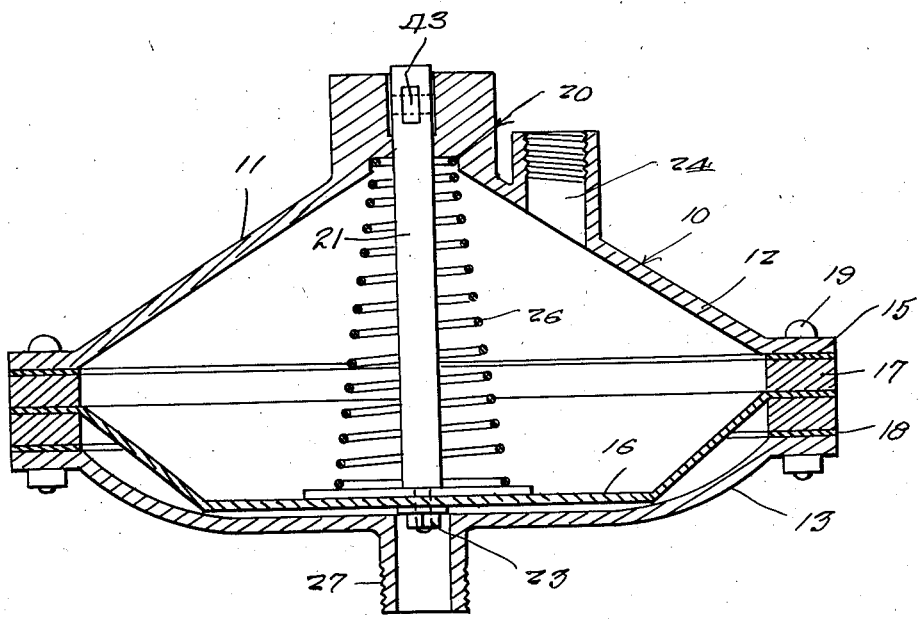
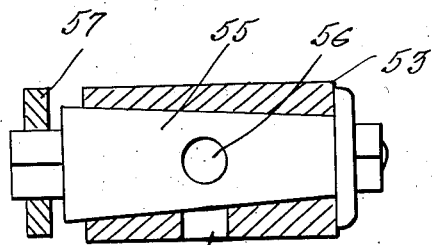
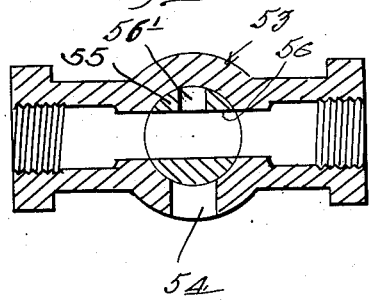
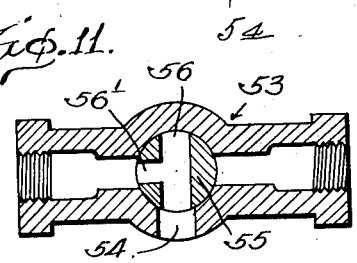
Inventor
Charles E. Piersall
By Clarence A. O'Brien
Attorney

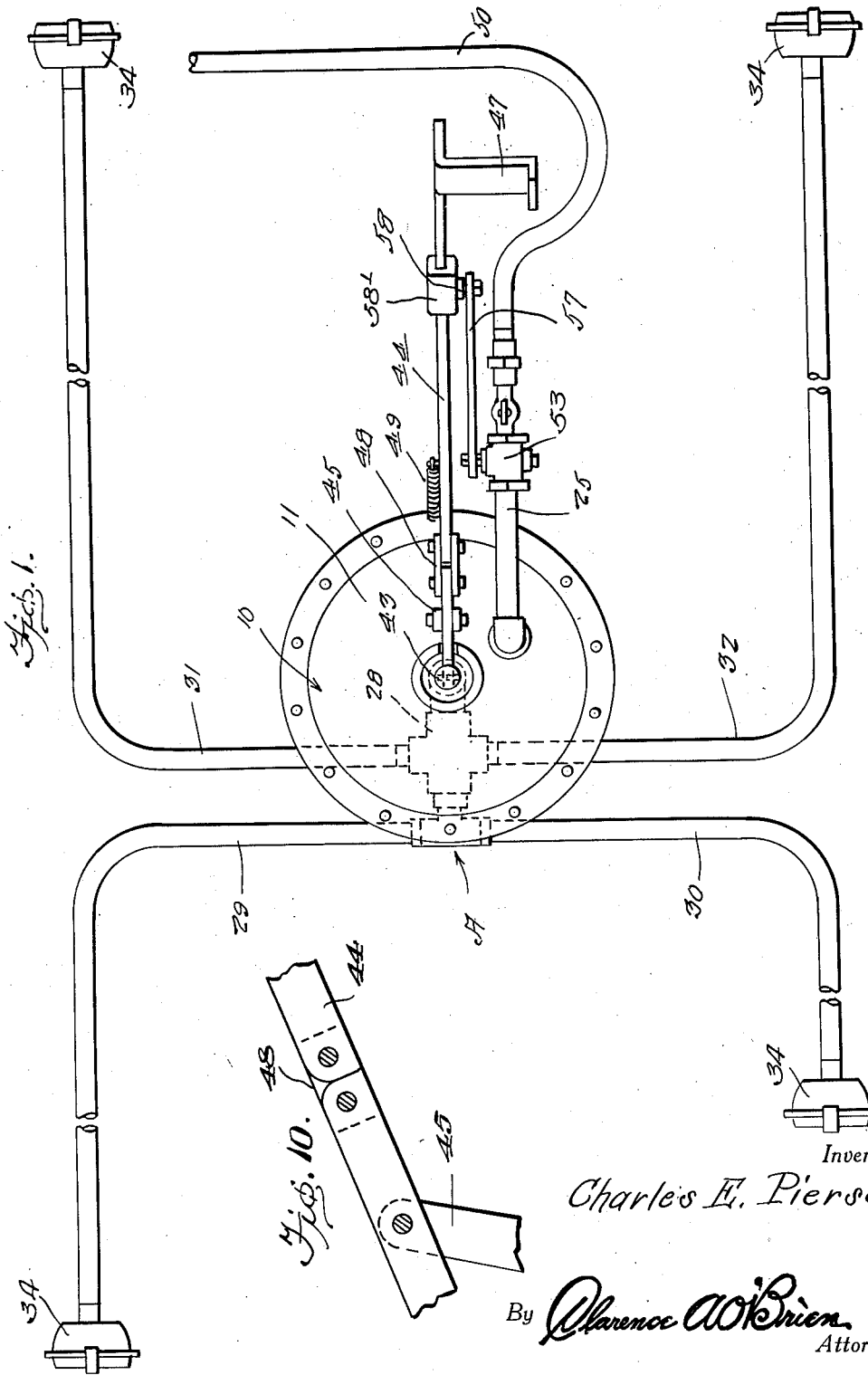

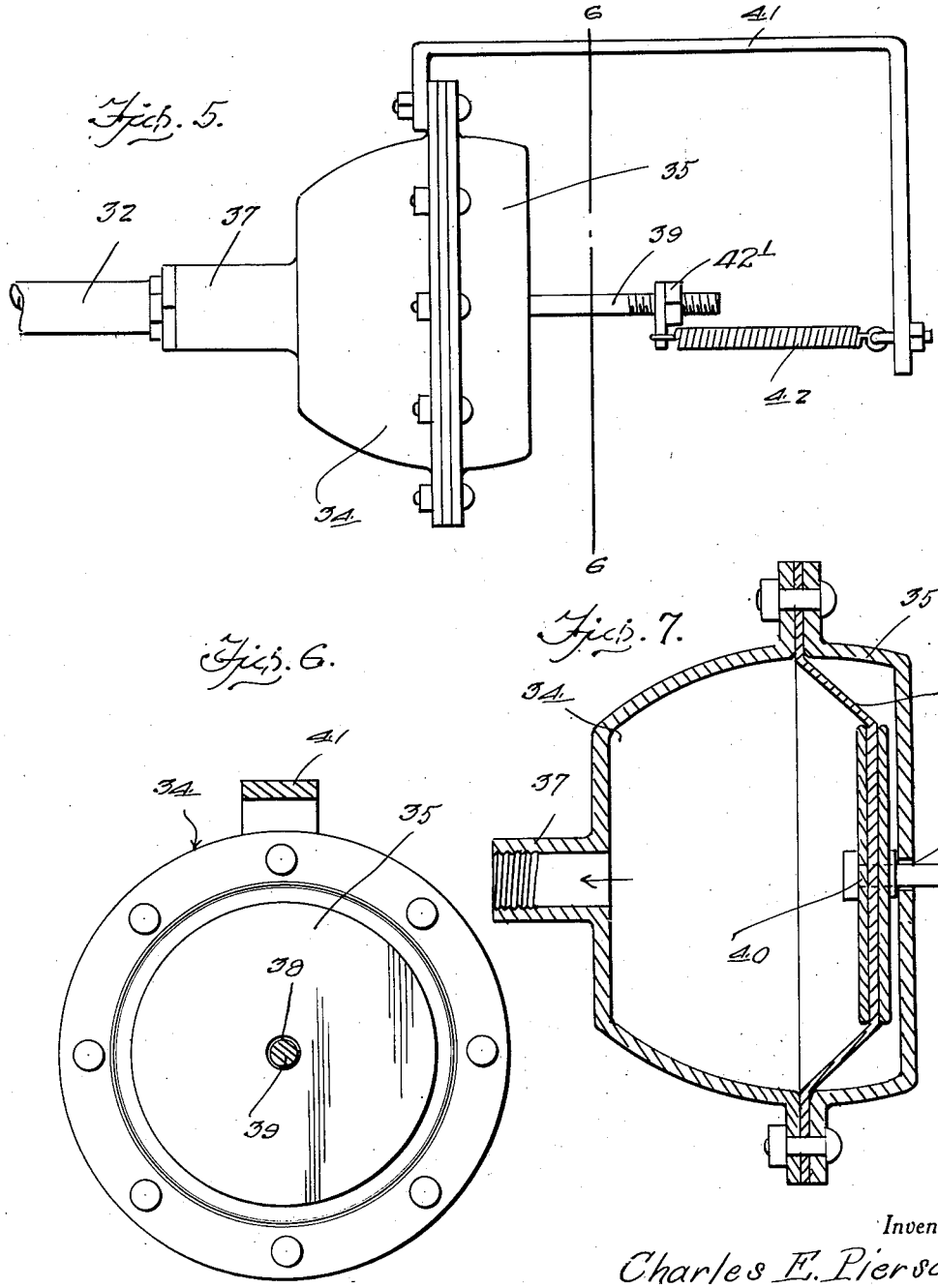

Patented Apr. 19, 1932

1,855,067

UNITED STATES PATENT OFFICE

CHARLES E. PIERSALL, OF MIDWEST, WYOMING, ASSIGNOR OF ONE-HALF TO C. J. CARTER, OF NATRONA COUNTY, WYOMING

AUTOMOBILE BRAKE

Application filed July 13, 1929. Serial No. 378,135.

This invention relates to brakes for vehicles and more particularly to a vacuum brake for automobiles.

One of the primary objects of my invention is to provide a novel brake for automobiles so constructed as to eliminate the necessity of providing the usual brake rigging, the invention embodying a diaphragm for the brake shoes of each brake drum with novel means under the control of the operator of the vehicle for actuating the diaphragm.

Another important object of my invention is the provision of a vacuum brake for automobiles, embodying a suction operated master diaphragm having operative connection through the medium of suitable suction pipes with independent suction operated diaphragms, for the brake shoes of each wheel of the vehicle with means actuated by the brake pedal for controlling the suction through the master diaphragm.

Further objects of my invention, will be the provision of a vacuum brake for automobiles embodying a master diaphragm connected by a suction pipe with the intake manifold of the internal combustion engine of the vehicle, whereby the master diaphragm can be actuated from the vehicle, the suction pipe having interposed in the length thereof a three-way valve normally closing the suction through the pipe and for establishing atmospheric communication with the master diaphragm, and a brake pedal having connection with the diaphragm and with said three-way valve whereby, upon downward pressure upon the brake pedal, the diaphragm will be raised thereby, and the three-way valve actuated to establish communication between the manifold and the master diaphragm for causing a suction on said diaphragm and thereby actuate the same, the master diaphragm being connected with brake shoe actuating diaphragms by suitable suction pipes.

Further objects of my invention are the provision of novel means for constructing the brake pedal whereby a portion of the pedal can be quickly returned to normal position by spring means for closing communication between the manifold and master diaphragm, and for establishing communication between the diaphragm and the atmosphere for permitting the quick release of the brake.

A still further object of my invention, is to provide an improved vacuum brake of the above character which will be durable and efficient in use, one which is simple and easy to manufacture, and one which can be incorporated with an automobile at a low cost.

With these and other objects in view, the invention consists in the novel construction, arrangement and formation of parts, as will be hereinafter more specifically described, claimed, and illustrated in the accompanying drawings, in which drawings:—

Figure 1 is a fragmentary top plan view illustrating my improved device.

Fig. 2 is a fragmentary side elevation of my improved device, illustrating the connection between the brake pedal and the foot board of a motor vehicle, the foot board being shown in section.

Fig. 3 is a detail central vertical section through the master control device or diaphragm, showing the same in its normal inoperative position.

Fig. 4 is a detail sectional view illustrating the means of connecting the main suction pipe for the master control device with the intake manifold of the internal combustion engine.

Fig. 5 is a detail side elevation of one of the brake shoe operating diaphragms.

Fig. 6 is a vertical section taken on the line 6—6 of Fig. 5.

Fig. 7 is a central vertical section thru one of the brake operating diaphragms.

Fig. 8 is a detail sectional view through the three-way valve employed for controlling the operation of the master control diaphragm device.

Fig. 9 is a detail longitudinal section thru said valve in the position whereby communication between the master control device and the engine manifold is established.

Figure 10 is a fragmentary detail view in longitudinal section showing the joints connecting the two sections of the foot pedal arm.

Figure 11 is a detail longitudinal sectional view through the three-way valve showing same in position for venting the master control device or diaphragm to atmosphere.

Referring to the drawings in detail, wherein similar reference characters designate corresponding parts throughout the several views, the letter A generally indicates my improved vacuum brake, which comprises a main control device or diaphragm 10. The main control device or diaphragm 10 embodies a casing 11 including upper and lower companion casing sections 12 and 13 having formed at their peripheries attaching flanges 15. These flanges 15 receive therebetween the flexible body or diaphragm proper 16. I preferably place the diaphragm proper 16, between spacing rings 17 and sealing washers 18 can be interposed between said rings and the flanges 15.

Suitable bolts 19 are passed through the flanges 15, the washers 18, and the rings 17 for holding the sections of the casing 10 assembled in position. The section 12 of the casing 11 is provided with an axially disposed boss 20 through which slidably extends the diaphragm rod 21.

The lower end of the rod 21 is connected in any desired way, as at 23 at the axial center of the diaphragm proper 16. At one side of the boss 20 the section 12 of the casing 11 is provided with an internally threaded nipple 24, having connected therewith a suction pipe 25. An expansion spring 26 is placed about the diaphragm rod 21 and engages the diaphragm 16 and the inner surface of the section 12 of the casing, and normally functions to hold the diaphragm in its lowered, or inoperative position. An outlet suction nipple 27 is formed on the section 13 of the casing 11 below the diaphragm 16.

Connected with the nipple 27 is a suitable four-way coupling 28 having connected therewith branch pipes 29, 30, 31, and 32 each of which leads to a diaphragm device 34. The auxiliary diaphragm devices 34 each include a sectional casing 35 having clamped between the sections thereof the flexible diaphragm proper 36. I have shown one section of each casing 35 provided with a nipple 37 on one side of the diaphragm for connection with its respective suction pipe leading from the coupling 28.

The opposite section of each casing 35 is provided with an axial opening 38 through which extends a rod 39 connected as at 40 with the axial center of the diaphragm. I provide one of the diaphragm devices 34 for the brake shoes of each wheel of the vehicle.

The rods 39 are operatively connected to the brake shoes of the vehicle in any preferred way. By referring to Fig. 5 of the drawings, it can be seen that I provide a supporting bracket 41 which can be bolted to the casing 35 of each diaphragm device 34, and this bracket is connected to the rod 39 by a contractile coil spring 42, which functions to normally hold the diaphragm in the position shown in Fig. 7 and the brakes in their released position.

It is to be also noted that I have provided an adjustable connection 42' between the spring 42 and the rod 39 so that the tension of this spring can be controlled. It is to be further noted that the opening 38 is of larger diameter than the rod 39 so that one side of the diaphragm will be subjected to atmospheric pressure at all times.

Referring again to the master control device or diaphragm 10, it is to be noted that the upper end of the diaphragm rod 21 thereof is pivotally connected as at 43 with the lower end of the brake pedal 44. This brake pedal 44 is rockably mounted at a point within and intermediate its ends on a suitable bracket 45 which can be secured to the casing 11 of the master control device 10 or to any suitable part of the vehicle. The device 10 is to be secured on the chassis of the vehicle in any desired manner.

The brake pedal extends below the floor boards 46 of the vehicle in the usual way, and is provided with a foot piece 47 to facilitate the operation thereof. From the construction so far, it can be seen that when the brake pedal is depressed that the rod 21 will be drawn upwardly.

For a purpose, which will presently appear it is to be noted that I have formed the brake pedal in sections and connect the sections together by a rule or half hinge joint 48 to allow the outer foot pedal section to swing upward independently of the inner section, but which causes the synchronous swinging of the pedal sections upon the depressing of the pedal.

The outer pedal section is connected to the floor board 46 by a retractile coil spring 49 and thus the brake pedal is normally held in a raised position, with the brakes in their released position. The pipe 25 is connected, preferably by a flexible hose 50, with a tap 51 connected with the intake manifold 52 of the internal combustion engine of the automobile, and the pipe 25 has interposed in the length thereof a three-way valve 53.

The valve 53 is provided with an atmosphere port 54 and includes a rotatable valve plug 55 having communicating passages 56 and 56'. The plug has secured thereto an operating crank 57 which is, in turn, operatively connected to the brake pedal 44, as at 58, said connection including a sleeve 58' slidable on the pedal 44 and to which the crank 57 is pivotally connected.

Normally, the valve plug is disposed with the passage 56 in a vertical position, as seen in Figure 11 for closing communication between the master control device 10 and the manifold 52. When the pedal 44 is depressed, the plug 55 will be rotated to the position shown in Fig. 9 establishing full communication between the upper end of the master control device and the intake manifold, creating a suction on the upper face of the diaphragm proper 16, causing the raising thereof.

In the operation of my improved brake, the working parts of the device are normally disposed as illustrated in Figs. 3 and 7 of the drawings, and when it is desired to apply the brake, the pedal 44 is depressed, which will lift up on the rod 21 and move the flexible diaphragm proper 16 away from the nipple 27.

The master control device 10 will be vented to atmosphere during the initial upward movement of the diaphragm 16 as long as the passage 56 is in communication with the port 54 of the valve 53. This initial movement of the diaphragm 16 is usually sufficient to cause the desired application of the vehicle brakes. Raising of the diaphragm proper will cause a suction on the various pipes 29, 30, 32, and 33. This will create a suction within the auxiliary diaphragm devices 34 and the diaphragm 36 will be moved inward therein, thereby causing a pull on the rod 39 for applying the brakes. As explained above, this movement of the brake pedal is generally sufficient to apply the brakes to bring the vehicle to a halt, but should it be desired to apply the brakes quicker or with more force, the brake pedal may be pushed farther down, which will move the valve plug 55 to the position shown in Fig. 9 of the drawings, establishing complete communication between the intake manifold and the upper end of the master control device 10. This suction from the force of the diaphragm 16 which will create a greater suction in the various pipes, 29, 30, 31 and 32.

When it is desired to release the brakes, the pressure is released from the brake pedal 44 and the spring 49 will immediately swing the outer section of the brake pedal 44 upward, shutting off the suction from the intake manifold and venting the master control device 10 to atmosphere by rotating the valve core 55 from the position illustrated in Figure 9 to the position illustrated in Figure 11 of the drawing, thus allowing the spring 26 to return the diaphragm proper 16 to its lowered position. This forces air to the auxiliary diaphragm devices, and allows the springs 42 to operate the rods 29 for releasing the brake. When the diaphragm 16 returns to inoperative position the inner section of the foot pedal 44 is swung on the bracket 45 in longitudinal alinement with the outer section of the foot pedal by the rod 21, the outer section sliding in the sleeve 58' and said sleeve pivoting on the crank 57 to permit this movement of the inner section without actuating the valves 55, the device is then ready for another braking operation.

From the foregoing description it can be seen that I have provided an exceptionally simple, yet durable form of vacuum brake which eliminates the necessity of providing brake rigging as well as the use of a vacuum cylinder and pistons.

Changes in the details may be made without departing from the spirit or the scope of this invention.

Having thus described my invention, what I claim as new is:—

1. A braking mechanism for motor vehicles comprising a casing, a diaphragm operatively mounted in the casing a suction pipe connecting the casing with the intake manifold of the vehicle engine for actuating the diaphragm, a multiway valve interposed in the pipe for selectively establishing communication between the casing and the manifold and between the casing and the atmosphere for venting the casing a rod fixed to the diaphragm and extending slidably through the casing, a foot pedal pivotally supported intermediate its ends on the casing and having one end pivotally connected to the rod for manually actuating the diaphragm, a crank arm having one end fixed to the valve and its other end pivotally and slidably connected to the foot pedal for operating the valve upon actuation of the foot pedal, and brake operating means operatively connected to the casing for actuation by the diaphragm.

2. A braking mechanism for motor vehicles comprising a casing, a diaphragm operatively mounted in the casing, a suction pipe connecting the casing with the intake manifold of the vehicle engine for actuating the diaphragm, a multiway valve interposed in the suction pipe for selectively establishing communication between the casing and the manifold and between the casing and the atmosphere for venting the casing, a sectional foot pedal, one of the sections of the foot pedal being pivotally mounted intermediate its ends on the casing, a rod fixed, at one end, to the diaphragm and extending slidably through the casing and having its other end pivotally connected to one end of the pivotally mounted pedal section for manual actuation by the foot pedal, a half-hinge pivotally connecting the other section of the foot pedal to the other end of the pivotally mounted section for swinging movement in one direction independently of the first named section, resilient means for actuating the second named section independently of the first named section, a crank arm having one end operatively connected to the valve and its other end operatively connected to the second named pedal section for actuation thereby, and brake operating means operatively connected to the casing for actuation by the diaphragm.

3. A braking mechanism for motor vehicles comprising a casing, a diaphragm operatively mounted in the casing, a suction pipe connecting the casing with the intake manifold of the vehicle engine for pneumatically actuating the diaphragm in one direction, a multiway valve interposed in the suction pipe for selectively establishing communication between the casing and the manifold and between the casing and the atmosphere for venting the casing, a foot pedal, said foot pedal comprising a pair of sections, means connected with an intermediate portion of one of the sections for pivotally mounting same in the casing, a half hinge pivotally connecting the other section to one end portion of said one section for swinging movement in one direction independently of said one section, a rod extending slidably into the casing and having one end secured to the diaphragm and its other end pivotally connected to the one section for manually actuating the diaphragm in the aforesaid one direction, a coiled spring encircling the rod and engaged with the diaphragm for yieldingly urging same in the other direction, a sleeve slidably mounted on the independently swingable pedal section, a crank arm pivotally connected at one end to the sleeve and at its other end operatively connected to the valve for actuating said valve, a spring connected to the independently swingable pedal section for actuating same in one direction independently of the first named section, and brake operating means operatively connected to the casing for actuation by the diaphragm.

In testimony whereof I affix my signature.

CHARLES E. PIERSALL.